Patented Nov. 28, 1950

2,532,241

UNITED STATES PATENT OFFICE 2,532,241

POLYVINYL ACETAL FOAMS

John B. Ott, Dayton, Ohio, assignor to Monsanto Chemical Company, St. Louis, Mo., a corporation of Delaware No Drawing. Application July 9, 1949,
Serial No. 103,963

6 Claims. (Cl. 260—2.5)

This invention relates to plasticized polyvinyl acetal foams. More particularly, it relates to plasticized polyvinyl acetal foams which are at least partially thermoset.

Polyvinyl acetal resins are thermoplastic rigid materials. They can be plasticized with a large number of compounds to yield products ranging in properties from tough and rigid to soft and extremely pliable. These plasticized resins may be made into foams by conventional gasifying agents to yield stable porous products. However, the foams are soluble and fusible.

It is an object of this invention to provide foamed plasticized polyvinyl acetal resins.

Another object is to provide insoluble foamed plasticized polyvinyl acetal resins.

Still another object is to provide a process for preparing insoluble foamed plasticized polyvinyl acetal resins.

These and other objects are attained by incorporating diphenyl-4,4'-di(sulfonyl azide) in a plasticized polyvinyl acetal resin, and thereafter heating the mixture to 140–150° C.

The following examples are given in illustration and are not intended as limitations on the scope of this invention.

Example I

A polyvinyl butyraldehyde acetal resin containing about 3% acetate groups calculated as polyvinyl acetate, about 18% hydroxyl groups calculated as polyvinyl acetal, the remainder of the groups being substantially butyraldehyde acetal, is mixed with 40% by weight of dibutyl sebacate. To this mixture is added 4% by weight, based on the plasticized resin, of diphenyl-4,4'-di(sulfonyl azide). The mixture is malaxated on heated milling rolls at about 100–110° C. to obtain a uniform dispersion of the azide in the plasticized resin. No decomposition of the azide occurs in this step. The milled mixture is then heated in an open mold at 140° C. for 64 hours to produce a black brittle foam which is insoluble and infusible. The foam has a specific gravity of about 0.6.

Example II

Example I is repeated except that the foaming operation is carried out at 145° C. for 1 hour. The resultant foam is amber-colored and quite resilient. It has a specific gravity of about 0.4 and is insoluble in ethanol.

When other polyvinyl acetal resins are used such as those prepared from formaldehyde, acetaldehyde, 2-ethyl hexaldehyde and mixtures of the same, substantially identical results are obtained.

Diphenyl-4,4'-di(sulfonyl azide) is a new compound which is described and claimed in my copending application Serial No. 103,962, filed July 9, 1949 now U. S. Patent 2,518,249. The compound may be prepared by reacting diphenyl with chlorosulfonic acid or sulfuryl chloride followed by reaction with an inorganic azide. It is stable at temperatures up to 140° C. and its decomposition between 140 and 150° C. may be easily controlled. Its stability at temperatures below 140° C. makes it particularly valuable for incorporation into plasticized polyvinyl acetal resins since such incorporation is preferably carried out at elevated temperatures, i. e., about 100° C. to about 135° C. by malaxation on heated roll mills, in heated Banbury mixers or other conventional milling machines.

The amount of the azide to be used may be varied between about 1% and 25% or more by weight based on the total weight of the plasticized resin. Less than 1% is ineffective both for forming foams and for insolubilizing the resin. Above 25%, little advantage is gained by using the excess. Between 1% and 25%, the amount used will depend on the required properties of the finished foams. Larger quantities produced foams having lower specific gravities if the foaming takes place in an open mold. In a closed mold, the larger quantities develop more and smaller bubbles. Conversely, quantities near the lower point of the critical range yield foams having higher specific gravities. Furthermore, the amount of azide used will determine the degree of cross-linking obtained. At 25% azide, the foams will be rigid and brittle regardless of the amount of plasticizer present. At 4% azide, tough resilient foams may be obtained which are insoluble in known solvents for the resins.

As may be seen from the examples, the time and temperature of the foaming step will also affect the type and nature of the foams produced. The foaming step must be carried out at 140–150° C. Below 140° C., substantially no decomposition of the azide occurs. Above 150° C., the decomposition becomes uncontrollable and reproducible results cannot be obtained. Whereas temperatures as low as 140° C. may be used as shown in Example I, the time cycle is unnecessarily long. It is preferred to foam the resins at 144–146° C., which is the temperature at which the pure azide decomposes spontaneously when placed on a melting point bar. In this temperature range the decomposition is rapid and yet does not get out of hand and results obtained are easily reproducible.

The polyvinyl acetal resins employed according to this invention may be made by reacting an aldehyde with a partially or completely hydrolyzed polyvinyl ester. U. S. patent to Morrison, et al., Reissue 20,430, dated June 29, 1937, illustrates suitable methods for preparing such resins. Polyvinyl acetal resins prepared in this manner may have a certain number of ester groups, originally present in the polyvinyl ester, which have not been removed, as well as a certain number of hydroxyl groups (which have replaced ester groups) and have not been replaced with acetal groups.

Polyvinyl acetal resins may be made from various aldehydes or mixtures thereof, or even from ketones containing an active carbonyl group, or from mixtures of aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be employed. Polyvinyl acetal resins made from saturated lower aliphatic acetal resins made with saturated aliphatic aldehydes containing less than 9 carbon atoms and especially those made with formaldehyde, acetaldehyde, butyraldehyde, 2-ethyl hexaldehyde and mixtures thereof, are especially desirable.

According to one embodiment of the present invention, the polyvinyl acetal resins employed may be considered to be made up, on a weight basis, of 5-25% hydroxyl groups, calculated as polyvinyl alcohol, 0-40% acetate groups, calculated as polyvinyl acetate and the balance substantially acetal.

When the acetal is butyraldehyde acetal, according to one embodiment of this invention, the polyvinyl acetal resin contains, on a weight basis, 16-20% hydroxyl groups, calculated as polyvinyl alcohol, and 0-30% acetate groups, calculated as polyvinyl acetate, and the balance substantially butyraldehyde acetal.

When the acetal is formaldehyde acetal, according to another embodiment of this invention, the polyvinyl acetal resin may contain 5-8% hydroxyl groups, calculated as polyvinyl alcohol, 10-16% acetate groups, calculated as polyvinyl acetate, and the balance substantially formaldehyde acetal.

An example of a polyvinyl acetaldehyde acetal resin is one containing 7% hydroxyl groups calculated as polyvinyl alcohol, 17% acetate groups, calculated as polyvinyl acetate, and the balance substantially acetaldehyde acetal.

Typical of a mixed acetal resin is one which contains 13% hydroxyl groups calculated as polyvinyl alcohol, 2-6% acetate groups, calculated as polyvinyl acetate, and the balance acetaldehyde and butyraldehyde acetal groups, in a molar ratio of 65-50% acetaldehyde and 35-50% butyraldehyde acetal groups.

Any of the known plasticizers for the polyvinyl acetal resins may be used in the process of this invention. Among such plasticizers are alkyl, aralkyl and aryl esters of organic acids, trialkyl or triaryl phosphates, ether esters such as alkoxy alkyl phthalates, etc. The amount of plasticizer used varies according to properties desired in the final product.

Other conventional modifying agents may be added to the plasticized resin prior to the foaming step. Among such additives are dyes, pigments, fillers, lubricants, natural and synthetic resins, cellulose derivatives, etc.

The process and products of this invention are particularly advantageous in that the process permits the preparation of insoluble foams from soluble thermoplastic polyvinyl acetal resins under controlled conditions and the products are stable, insoluble and, if desired, infusible foams having all of the valuable properties of polyvinyl acetal resins without the disadvantages of solubility and fusibility.

The foamed resins may be used for insulation in refrigerators and deep freezer units. They may also be employed as fillers for life belts, buoys and other apparatus designed to be buoyant in water over long periods of time.

It is obvious that many variations may be made in the products and processes of this invention without departing from the spirit and scope thereof as defined by the appended claims.

What is claimed is:

1. A process for preparing an insoluble and infusible foamed product which comprises mixing from 1 to 25 parts of diphenyl-4,4'-di(sulfonyl azide) with 100 parts of a plasticized polyvinyl acetal resin and then heating the mixture at 140–150° C.

2. A process as in claim 1 wherein the polyvinyl acetal resin is a polyvinyl butyraldehyde acetal resin.

3. A process as in claim 2 wherein the plasticizer is dibutyl sebacate.

4. An insoluble infusible foamed product which comprises a mixture of 100 parts of a plasticized polyvinyl acetal resin and from 1 to 25 parts of diphenyl-4,4'-di(sulfonyl azide), said mixture having been heat treated at 140–150° C.

5. A product as in claim 4 wherein the polyvinyl acetal resin is a polyvinyl butyraldehyde acetal resin.

6. A product as in claim 5 wherein the plasticizer is dibutyl sebacate.

JOHN B. OTT.

REFERENCES CITED

The following references are of record in the file of this patent:

UNITED STATES PATENTS

| Number | Name | Date |
|---|---|---|
| 2,386,995 | Wigal | Oct. 16, 1945 |